United States Patent Office 3,197,963
Patented Aug. 3, 1965

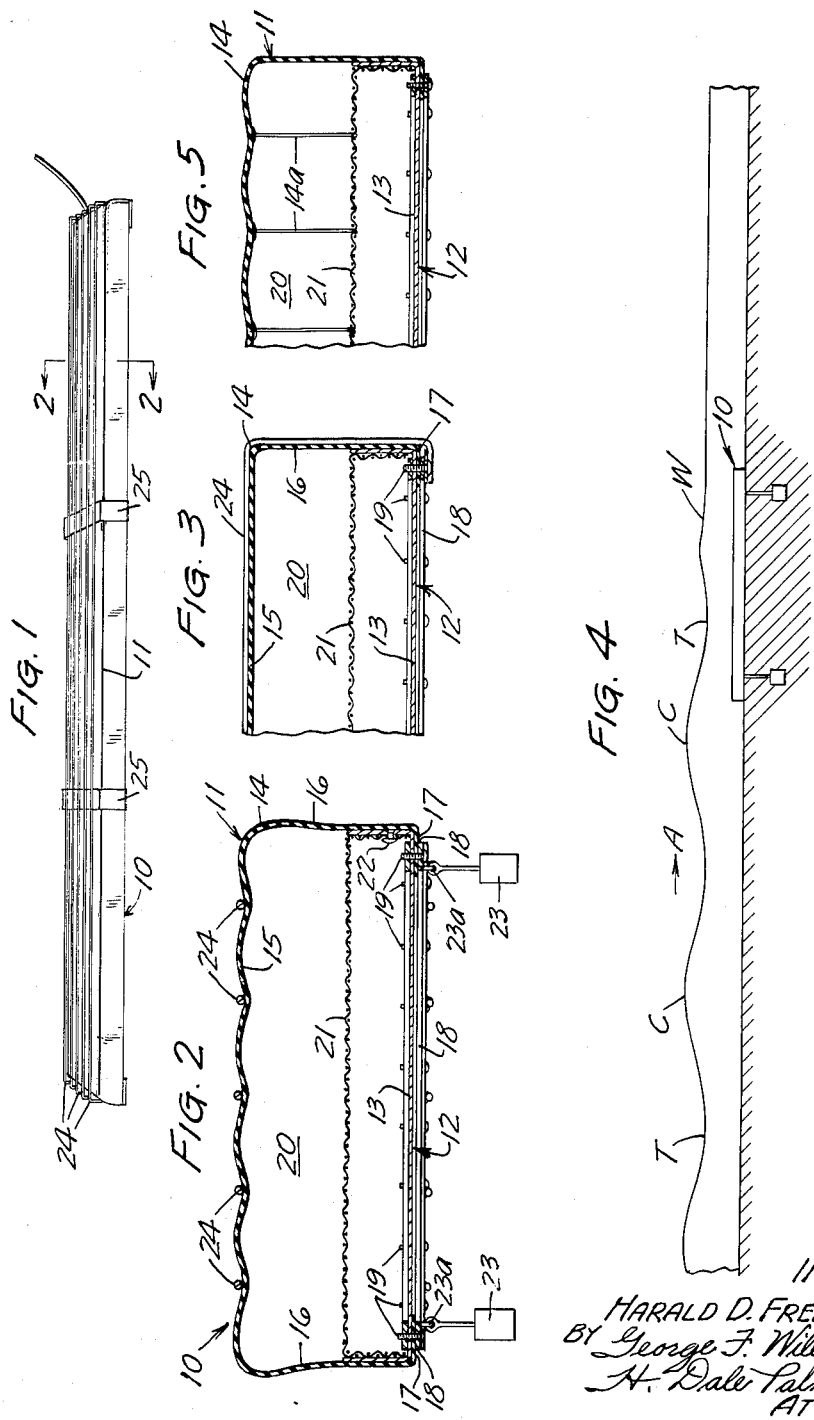

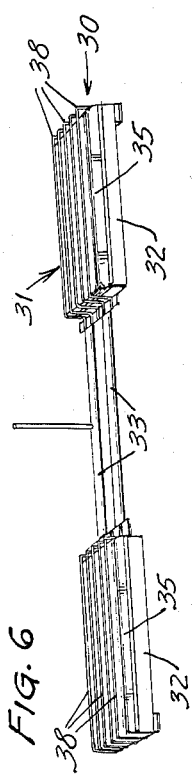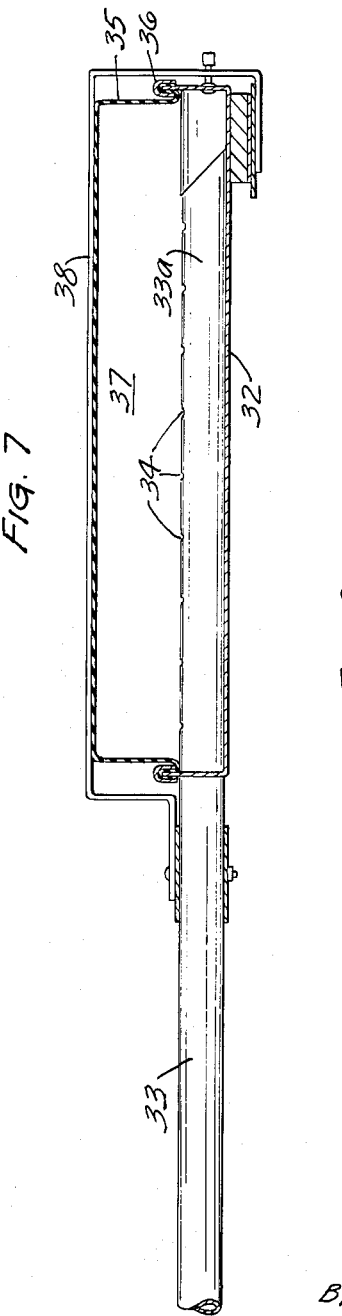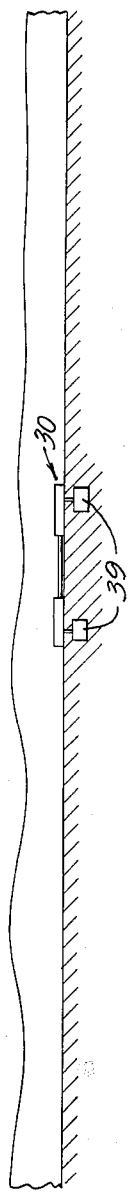

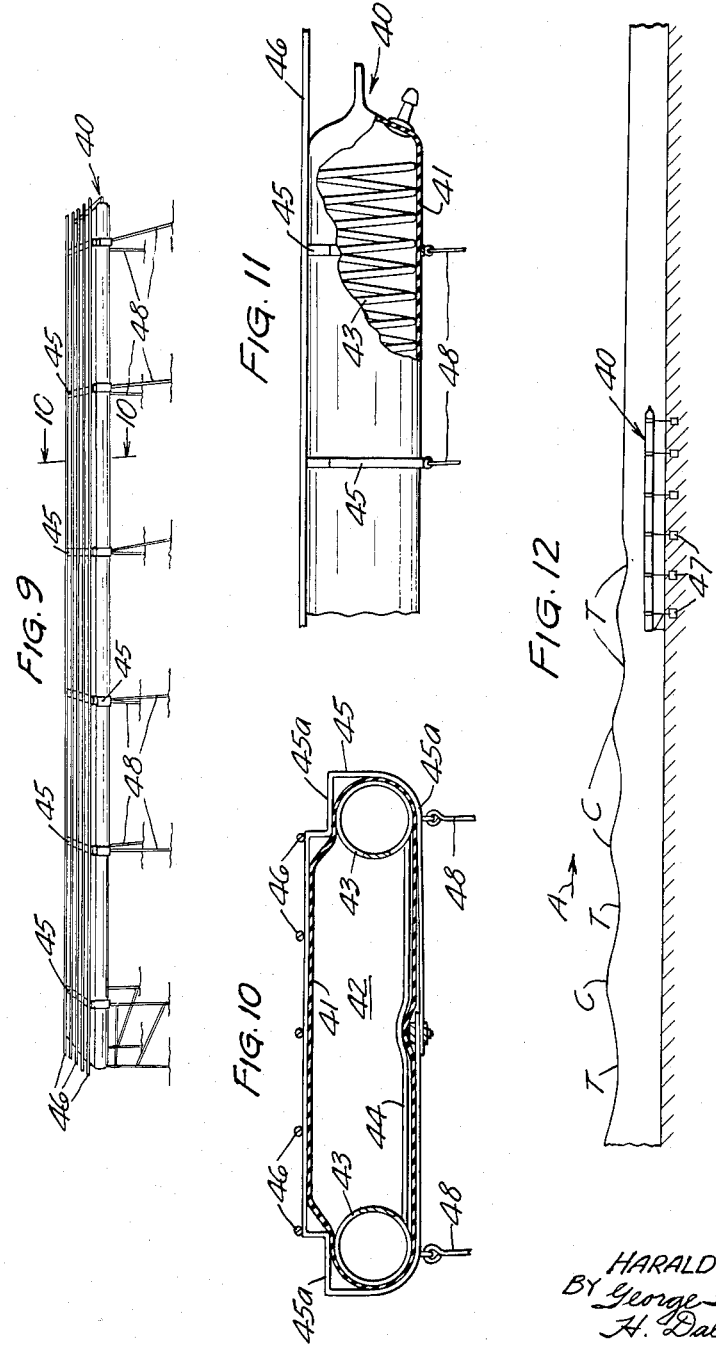

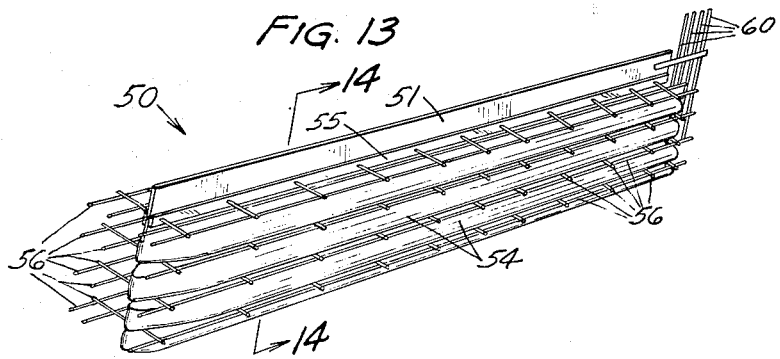
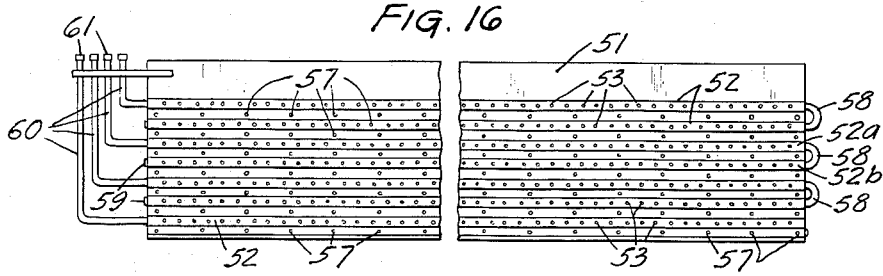
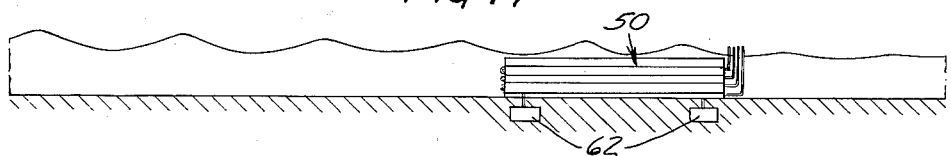
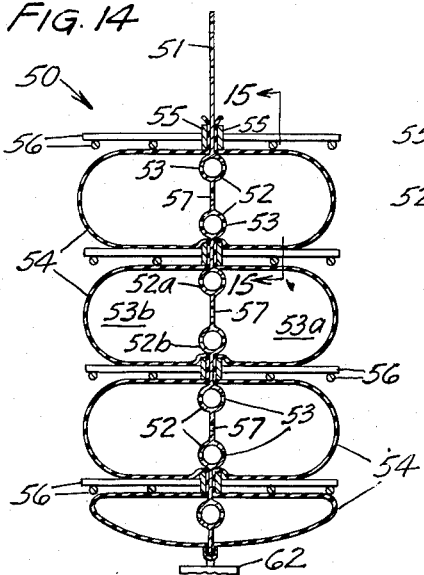
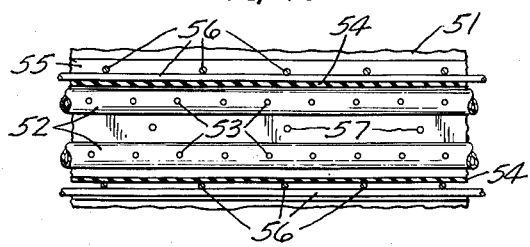

3,197,963
WAVE ATTENUATOR
Harald D. Frederiksen, Sacramento, Calif., assignor to The Regents of The University of Minnesota, Minneapolis, Minn., a corporation of Minnesota
Filed July 19, 1960, Ser. No. 43,919
12 Claims. (Cl. 61—5)

This invention relates to apparatus for attenuating wave action in a body of water and more specifically relates to apparatus to serve as a temporary breakwater which may be set up substantially at any desired location.

It is frequently desirable to damp gravity waves, surges or similar phenomena which occur in various types of bodies of water or other liquid, such as long ocean coastlines in canals and particularly power canals, navigation locks, harbors and between wharves.

An object of my invention is to provide a new and improved wave action arresting device of simple and inexpensive construction and operation.

Another object of my invention is to provide a novel wave action arresting device which may be easily transported to the area of use and readily and easily set up into operation.

Still another object of my invention is to provide a new and novel wave arrestor for attenuating the wave action and to decrease the relative height of the peak with respect to the bottom of the troughs of the wave.

A further object of my invention is to provide a wave action arresting apparatus which will serve as a breakwater without obstructing the water close to the surface so as to permit boats to come and go across the breakwater without being interfered with.

These and other objects and advantages of my invention will more fully appear from the following description made in connection with the accompanying drawings wherein like reference characters refer to the same or similar parts throughout the the several views and in which:

FIG. 1 is a perspective view of a segment of the device;

FIG. 2 is a detail section view taken on a plane as indicated at 2—2 in FIG. 1;

FIG. 3 is a detail section view taken longitudinally through one end of the device;

FIG. 4 is a diagrammatic view showing the wave action arresting result performed by the device;

FIG. 5 is a detail section view similar to FIG. 3, but showing a modified form of the device;

FIG. 6 is a perspective view of another form of the apparatus;

FIG. 7 is a detail longitudinal section taken on a vertical plane through the form of the invention shown in FIG. 6;

FIG. 8 is a diagrammatic view showing the wave action attenuating result performed by the apparatus shown in FIGS. 6 and 7;

FIG. 9 is a perspective view of still another form of the invention;

FIG. 10 is a detail transverse section view taken on a vertical plane as indicated at 10—10 in FIG. 9;

FIG. 11 is a detail elevation view of one end of the apparatus shown in FIG. 9 with a portion broken away for clarity of detail;

FIG. 12 is a diagrammatic view showing the wave attenuating result obtained by the form shown in FIGS. 9–11.

FIG. 13 is a perspective view showing still another form of the invention;

FIG. 14 is a detail cross section view of the apparatus shown in FIG. 13; and taken on a plane at 14—14 in FIG. 13;

FIG. 15 is a detail section view taken on a vertical plane as indicated at 15—15 in FIG. 14;

FIG. 16 is a detail elevation view, partly broken away, of the frame structure of the form shown in FIG. 13; and FIG. 17 is a diagrammatic view showing the wave action attenuating result performed by the apparatus shown in FIGS. 13–16.

The form of the invention shown FIGS. 1–4 comprises an elongate hollow body 10 having a bladder-like upper portion 11 and having a rigid bottom 12. The rigid bottom 12 comprises an elongate pan 13 of low height as compared to its breadth, and in the form shown, the pan 13 is constructed of substantially rigid sheet material. The bladder-like upper portion 11 comprises a sheet of pliable and flexible membrane 14 which defines the top wall 15 and side walls 16 of the hollow body 10. The edge portions 17 of the membrane extend downwardly along the sides of the shallow pan 13 and are affixed to the pan by means of elongate clamping bars 18 and bolts 19. The bottom 12, together with the bladder-like upper portion 11 define the interior chamber 20 which extends throughout the entire length of the hollow body 10 and by virtue of the bladder-like upper portion 11, the chamber 20 is expandable and collapsible and the chamber 20 may have longitudinally spaced portions thereof simultaneously collapsed and expanded. A conduit means, provided by the perforate screen 21 which extends throughout the entire length of the pan 12 and is secured therein as by screws 22, prevents membrane 14 at any one location along the length thereof from collapsing against the bottom of the pan to prevent ready and easy flow of gaseous fluid from one end of the chamber 20 to the other end thereof. The hollow body 10 is also provided with a plurality of anchors 23 affixed as by bracket 23a to the bottom 12 of the hollow body, and the anchors 23 may take any suitable form such as concrete anchors embedded in the bedrock at the bottom of the body of water such as the ocean, just off the shore line.

The hollow body is provided with a quantity of gaseous fluid such as air in the chamber 20 thereof and a quantity of air is provided in the chamber 20 such that when the hollow body is anchored in a submerged location in the body of water, the chamber is in partially expanded condition, assuming, of course, that conditions are static. In any event the quantity of air will not approach the maximum quantity which could be put into the chamber 20 and the flexible membrane 14 will be in such a condition that one portion of the chamber can be easily collapsed and another longitudinally spaced portion will be expanded simultaneously.

Preferably, the chamber is inflated by the air up to approximately 40% to 60% of its capacity volume.

Means are provided for restricting expansion of the membrane 14 and in the form shown such means comprise a gridwork structure 24 overlying the top wall portion 14 of the membrane 14, and the gridwork structure 24 consists of a plurality of elongate and parallel rods which are affixed at their ends to the rigid bottom 12 of the hollow body.

A pair or more of cross braces 25 may be provided at intermediate points along the length of the bag for anchoring the gridwork 24 against upward movement. The cross braces 24 are also anchored to the bottom 12 of the body.

When the hollow body 10 is anchored in a submerged location beneath the surface of the water W, the operation is such that as the crest C of the wave is imposed upon the partially inflated hollow body 10, the rubber membrane upper portion 11 collapses under the crest to collapse a portion of the chamber 20, and another portion of the chamber 20 is expanded through the inflation effected by the gaseous fluid in the chamber and also under the influence of the water at the trough T. The air pocket thus formed under the trough T travels along the hollow body until it reaches the end of the hollow body. This action causes collapse of the wave crest C and filling of the trough T by the generation of another wave.

It is believed that there is turbulent dissipation of energy by the fact that this air pocket is traveling in a direction opposite to the instantaneous fluid particle motion of the trough, and generation of waves upstream to incoming waves as well as downstream. The extent to which the hollow body contributes to the wave attenuation and energy dissipation varies with the wave length and height imposed upon the device.

It will be understood that when this device is used as a breakwater, a plurality of similar hollow bodies 10 are oriented in side-by-side relation so that each of the elongate hollow bodies extends in the direction of wave travel. The diagrammatic view shown in FIG. 4 shows the actual wave attenuation which was accomplished throughout the use of the instant invention. The wave crests were traveling in the direction or arrow A. As the crests and troughs passed over the device 10, the waves were, for all practical purposes, attenuated into a smooth water condition.

It has been found that the wave arrestor 10 is effective in attenuating the action of waves which may vary considerably in length. It has been found that if the wave length is nearly equal to the length of the wave arrestor 10, the attenuation of waves is very nearly complete, but it has been further found that the action of the wave arrestor is effective for waves which vary from 0.7 to 2.5 times the length of the arrestor or hollow body 10.

It has been found that the device 10 will attenuate waves of various heights and it has been found successful to employ a membrane of such a height approximately equal to the height of the waves.

It will be seen that by virtue of the submerged location of the hollow body or device 10, there is substantially no interference with normal navigation over the device when it is in the submerged location and operating to attenuate the wave action.

The form of the invention shown in FIG. 5 is substantially similar to that shown in FIG. 1-4. In FIG. 5, the means for preventing excessive expansion of the bladder-like upper portion is provided by a plurality of flexible tabs 14a which are secured at their upper ends to the membrane 14, and are secured at their lower ends to the rigid bottom and specifically in the form shown, are secured to the screen 21. The tabs 14a are spaced from each other at such distances as to prevent excessive bulging of the membrane 14 when air is forced into one portion of the chamber 20. In this form of the invention, the tab 14a replaced the gridwork 24 shown in FIGS. 1-4, but it will be understood that in certain instances, it may be desirable to supplement the gridwork 24 with the tabs 14a.

In the form of the invention shown in FIGS. 6-8, the device 30 comprises an elongate hollow body 31 which has pans 32 disposed at each end thereof and interconnected by conduits 33. The end portions 33a of the conduits which extend into each of the pans 32 have apertures 34 spaced along the length thereof. Membranes 35 are secured at their edge portions to the upper edges of the pans 32 by means of brackets 36. It will be seen that the membranes 35 define the side and top walls of the end portions 37a of the common interior chamber of the entire device 30. A gridwork consisting in a plurality of rigid rods 38 is secured to the bottom of the pan and to the conduits 33 in overlying relation with the membrane 35 so as to restrict expansion of the chamber and upward movement of the membranes. In FIG. 8 is shown the attenuating result performed by this form of the invention which operates in a fashion similar to that described in connection with FIGS. 1-4.

It will be seen, however, that the attenuation through the use of the instant form of the invention is not quite so complete as shown in the form of the invention in FIGS. 1-4. Again, the device 30 is secured by means of anchors 39 on the bottom of the body of water in a submerged condition. It will further be understood that a quantity of gaseous fluid is provided in the device 30 such that the end portions 37 of the common chamber are partially inflated when in the submerged location and under static conditions. As in the form previously described, the longitudinally spaced end portions 37 of the common chamber respectively and simultaneously collapse and expand.

In the form of the invention shown in FIGS. 9-12, the device or hollow body 40 has a membrane wall 41 which defines the complete enclosure and comprises the entire wall for the interior chamber 42. The membrane 41 is supported by a pair of helically wound and substantially rigid rods 43 which have spaced convolutions and which may comprise coil springs. The coil rods 43 inside the chamber 42 hold the membrane in the desired shape, and are interconnected by means of a plurality of rigid rods 44 which are welded at their opposite ends to the coiled rods 43. The coiled rods 43 provide conduit means preventing complete collapse of the membrane 41 at any location along the length of the body 40 so as to allow ready and easy flow of the gaseous fluid which is contained in the chamber 42.

A plurality of rigid bands 45 are wrapped around the outside of the membrane 41 and have clamping portions 45a for holding the membrane against the coiled rods 43. The bands 45 mount a plurality of rods 46 which extend longitudinally throughout the length of the device 40 for restraining upward movement of the membrane 41. Anchors 47 are connected to the bands 45 by means of elongate rigid links 48 so as to support the device 40 at a submerged location, but at mid-depth, between the bottom of the body of water and the surface. It has been found desirable in certain instances to mount the device 40 at mid-depth for obtaining the desired wave action attenuation. As seen in FIG. 12 the wave crests C traveling shorewardly in the direction of arrow A are collapsed as they pass over the device 40 and the troughs T are filled.

The wave action arresting device 50 shown in FIGS. 13-17 includes an upright and rigid frame plate 51 which has a plurality of conduit portions 52 formed integrally thereof, and each of the conduit portions 52 has a plurality of apertures 53 disposed along the length thereof. Adjacent pairs such as 52a and 52b of said conduits are enclosed within chambers 53a and 53b defined by bladder-like membranes 54 which are secured to the plate 51 by means of rigid clamping strips 55 to which are secured the gridwork rods 54. Certain of the rods 56 extend crosswise and others extend lengthwise. The plate 51 is provided with a plurality of apertures 57 to provide intercommunication between opposite pairs of membranes.

Corresponding ends of each pair of conduits 52 are interconnected by means of a U-shaped pipe 58. At the other ends, a plug 59 is provided in one of the pair and a filling pipe 60 which may be provided with any type of a closure such as cap 61 is secured to the other conduit of the pair. It will therefore be seen that air can be injected through the pipe 60, through the conduits 52a and 52b into the chambers 53a and 53b for inflating the membrane. As in the other forms of the invention, such a quantity of air is provided as to cause the chambers to be partially expanded when the device 50 is held in a submerged condition by means of anchors 62. As seen in FIG. 17, the experience with this wave arresting device 50 is similar to the result obtained with the other forms.

The length of the device 50 is substantially the same as that described in connection with the form shown in FIGS. 1–4 and this same length is approximately equalled in the other remaining forms of the invention.

It will, of course, be understood that various changes may be made in the form, details, arrangement and proportions of the parts without departing from the scope of my invention which consists of the matter shown and described herein and set forth in the appended claims.

What I claim is:

1. A wave arrestor for use in a body of water comprising an elongate and closed hollow body to be oriented in a horizontal position and having an interior chamber with opposite ends in fluid communicating relation with each other; said hollow body having a rigid bottom and having a flexible membrane defining the top and side walls of said chamber at the opposite ends of said chamber to permit simultaneous expansion and collapsing of the chamber at the opposite ends thereof, a quantity of gaseous fluid in said chamber and maintaining the chamber in partially expanded condition at the submerged location to permit differential expansion and collapsing of the opposite ends of said chamber, said rigid bottom including substantially rigid fluid-carrying conduit means extending longitudinally of the body the full length thereof, said conduit means being spaced beneath said membrane top wall and being perforated at a multiplicity of positions along the length thereof for receiving and discharging fluid and thereby preventing the membrane walls from seating against the bottom and thereby restricting longitudinal flow of fluid in the chamber and between the ends thereof, restraining means surrounding the upper portion of the chamber to limit expansion, bottom anchoring means for holding said body in a submerged location and in a horizontal position and extending in the direction of wave travel, whereby the height of traveling waves is attenuated as the waves travel over the wave arrestor.

2. A wave arrestor for use in a body of water, comprising an elongate and closed hollow body having an interior chamber extending throughout the length of the body and also having a bottom and longitudinally extending flexible membrane top and side walls for said chamber to permit longitudinally spaced portions of the chamber to be simultaneously collapsed and expanded, anchoring means for holding said body in a submerged location and in a horizontal position and extending in the direction of wave travel, a quantity of gaseous fluid in said chamber and maintaining the chamber, under static conditions, in a partially expanded condition at the submerged location, to permit, as one portion of the chamber is collapsed, other portions of the chamber to expand, and fluid-carrying conduit means in the chamber and extending substantially throughout the length thereof, said conduit means being spaced inwardly from the membrane walls to permit inward and outward movement thereof for collapsing of the chamber, said conduit means being perforated at a multiplicity of positions along the length thereof for receiving and discharging said fluid and thereby preventing longitudinally spaced portions of the chamber from being sealed off from each other by the membrane walls, whereby to attenuate the magnitude of traveling waves moving over the hollow body.

3. A wave arrestor for use in a body of water, comprising an elongate and closed hollow body having an interior chamber extending throughout the length of the body and having a flexible membrane defining the top and side walls of the chamber, said hollow body having a rigid frame for maintaining the shape of said chamber, said membrane top and side walls permitting simultaneous collapsing and expansion of longitudinally spaced portions of the interior chamber said rigid frame defining non-collapsible duct means extending the length of the hollow body, anchoring means for holding said body in a submerged location and oriented in a substantially horizontal position and extending in the direction of wave travel, a quantity of gaseous fluid in said chamber and maintaining the chamber, under static conditions, in a partially expanded condition whereby to permit longitudinally spaced portions of the chamber to be simultaneously collapsed and expanded, restraining means anchored to the frame of said hollow body and engaging the membrane top and side walls in outward movement in restraining relation to prevent excessive expansion of portions of the chamber when other portions of the chamber are collapsed in response to travel of a wave, the height of which is attenuated during movement over the hollow body.

4. A wave arrestor for use in a body of water, comprising an elongated and closed hollow body to be oriented in a horizontal position and having an interior chamber with opposite ends in fluid-communicating relation with each other, said hollow body including a rigid bottom consisting in an elongate broad pan of low height and forming the bottom wall of said chamber, said hollow body also including a flexible membrane forming the top and side walls of said chamber, the edge portions of said membrane being sealed to said pan, means for anchoring the hollow body in a submerged location oriented longitudinally in the direction of wave travel, a quantity of gaseous fluid in said chamber and maintaining the chamber, under static conditions, in partially filled condition when at the submerged location so as to permit differential expansion and collapsing of the opposite ends of the chamber which action attenuates the height of traveling waves passing over the submerged hollow body.

5. The invention set forth in claim 4 and including a perforate and substantially rigid structure secured to the pan in spaced relation therewith and cooperating with the pan in defining a longitudinally-extending fluid-carrying conduit through which the gaseous fluid may quickly pass as longitudinally spaced portions of the chamber are sequentially collapsed and expanded.

6. The invention set forth in claim 4 and including an elongate perforate fluid flow-carrying conduit secured to the pan and extending throughout substantially the entire length of the chamber to permit the gaseous fluid to pass between expanding and collapsing longitudinally spaced portions of the chamber.

7. A wave arrestor for use in a body of water including an elongate and closed hollow body to be oriented in a horizontal position and having an interior chamber extending throughout the length of the body, said hollow body being constructed of flexible membrane material which defines the walls of said chamber, a pair of elongate and parallel pervious, substantially rigid conduits spaced from each other in said chamber, rigid means securing said conduits in fixed relation with respect to each other to define the general shape of the membrane walls, the top portion of said membrane wall being expandible outwardly and collapsible inwardly to permit longitudinally spaced portions of the chamber to be simultaneously collapsed and expanded, anchoring means securing said body in a submerged location and extending in the direction of wave travel, a quantity of gaseous fluid in said chamber and maintaining said chamber, under static conditions, in a partially expanded condition at the submerged location, to permit, when the gaseous fluid is forced from one end of the chamber to the other, simultaneous expansion and collapsing of the opposite end portions of the chamber, whereby the height of traveling waves is attenuated as the waves pass over the hollow body.

8. The invention set forth in claim 7 wherein said conduits comprise helically wound rods having spaced convolutions.

9. A wave arrestor for used in a body of water, comprising an elongate upright frame structure, anchoring means securing said frame structure in a submerged location in the body of water and extending in the direction of wave travel, a plurality of pairs of flexible membrane enclosures on the frame structure, each of said pairs being superposed with respect to each other, each pair of membrane enclosures being disposed on opposite sides of said upright frame structure and being in sealed relation with respect to each other to define a common interior chamber, the frame structure being apertured between each membrane closure of a pair of membrane closures to provide intercommunication therebetween, and rigid means on the frame structure and overlying each of said pairs of membrane closures to restrict upward movement thereof, and a quantity of gaseous fluid in each of said chambers and maintaining said chambers in partially expanded condition at the submerged location to permit longitudinally spaced portions of the chambers to be simultaneously collapsed and expanded, whereby to arrest the action of the waves traveling thereover.

10. A wave arrestor for use in a body of water, comprising an elongate and closed hollow body having an interior chamber extending throughout the length of the body and having a flexible membrane defining the top and side walls of the chamber, said hollow body having a rigid frame comprising the bottom of said chamber for maintaining the shape of said chamber, said membrane top and side walls permitting simultaneous collapsing and expansion of longitudinally spaced portions of the interior chamber, anchoring means for holding said body in a submerged location and oriented in a substantially horizontal position and extending in the direction of wave travel, a quantity of gaseous fluid in said chamber and maintaining the chamber, under static conditions, and a partially expanded condition whereby to permit longitudinally spaced portions of the chamber to be simultaneously collapsed and expanded, restraining means comprising a grid work anchored to the frame of said hollow body and overlaying the exterior of said membrane top and side walls and engaging the membrane top and side walls in outward movement in restraining relation to prevent excessive expansion of portions of the chamber when other portions of the chamber are collapsed in response to the travel of a wave, the height of which is attenuated during movement over the hollow body.

11. A wave arrestor for use in a body of water, comprising an elongate and closed hollow body having an interior chamber extending throughout the length of the body and having a flexible membrane defining the top and side walls of the chamber, said hollow body having a rigid frame comprising the bottom of said chamber, said membrane top and side walls permitting simultaneous collapsing and expansion of longitudinally spaced portions of the interior chamber, anchoring means for holding said body in a submerged location and oriented in a substantially horizontal position and extending in the direction of wave travel, a quantity of gaseous fluid in said chamber and maintaining the chamber, under static conditions, and a partially expanded condition whereby to permit longitudinally spaced portions of the chamber to be simultaneously collapsed and expanded, restraining means anchored to the frame of said hollow body and engaging the membrane top and side walls in restraining relation to prevent excessive expansion of portions of the chamber when other portions of the chamber are collapsed in response to travel of a wave, the height of which is attenuated during movement over the hollow body, said restraining means including a plurality of elongate flexible elements in the chamber having opposite end portions respectively secured to said bottom and to the membrane top wall to restrain upward movement of said top wall.

12. A wave arrestor for use in a body of water, comprising an elongate and closed hollow body having an interior chamber extending throughout the length of the body defined by top, bottom and side walls, all of the chamber-defining walls of said hollow body being constructed of flexible membranes, said hollow body having a rigid frame, the rigid frame of said body being disposed within said walls, the membrane top and side walls permitting simultaneous collapsing and expansion of longitudinally spaced portions of the interior chamber, anchoring means for holding said body in a submerged location and oriented in a substantially horizontal position and extending in the direction of wave travel, a quantity of gaseous fluid in said chamber and maintaining the chamber, under static conditions, in a partially expanded condition whereby to permit longitudinally spaced portions of the chamber to be simultaneously collapsed and expanded, restraining means anchored to the frame of said hollow body and engaging the membrane top and side walls in outward movement in restraining relation to prevent excessive expansion of portions of the chamber when other portions of the chamber are collapsed in response to travel of a wave, the height of which is attenuated during movement over the hollow body, said restraining means comprising a rigid cage structure clamped to the walls and rigid frame and including a grid work overlying the top membrane wall of the hollow body for restraining upward movement thereof.

References Cited by the Examiner

UNITED STATES PATENTS

| 2,420,384 | 5/47 | Ship | 114—54 |
| 2,584,867 | 2/52 | Guarin | 61—5 |
| 2,850,252 | 9/58 | Ford. | |
| 2,938,488 | 5/60 | Hathaway | 114—54 |
| 3,080,844 | 3/63 | Lehmann | 114—54 |

FOREIGN PATENTS

| 145,007 | 7/20 | Great Britain. |
| 335,226 | 3/21 | Germany. |
| 377,004 | 6/23 | Germany. |
| 484,440 | 7/52 | Canada. |

EARL J. WITMER, *Primary Examiner.*

JACOB L. NACKENOFF, JACOB SHAPIRO,
*Examiners.*